United States Patent [19]

Holley

[11] Patent Number: 4,726,755

[45] Date of Patent: Feb. 23, 1988

[54] DISC PELLETIZER

[76] Inventor: Carl A. Holley, 67 Eureka Rd., Wyandotte, Mich. 48192

[21] Appl. No.: 72,782

[22] Filed: Jul. 13, 1987

[51] Int. Cl.$^4$ .............................................. B29B 9/08
[52] U.S. Cl. .................................................. 425/222
[58] Field of Search .......................................... 425/222

[56] References Cited

U.S. PATENT DOCUMENTS

| 3,326,642 | 6/1967 | Ruble | 425/222 |
| 3,353,208 | 11/1967 | Fergus | 425/222 |
| 4,214,863 | 7/1980 | Nixon | 425/222 |
| 4,330,246 | 5/1982 | Verasso | 425/222 |
| 4,569,648 | 2/1986 | Riederer et al. | 425/222 |

FOREIGN PATENT DOCUMENTS 1118761 12/1961 Fed. Rep. of Germany ...... 425/222

OTHER PUBLICATIONS

The Condense Chemical Dictionary, V. N. Reinhold Co., Apr. 1981, pp. 830, 831, Lib of Cong. No. 80-29636.

Primary Examiner—Tim Miles
Attorney, Agent, or Firm—William J. Ruano

[57] ABSTRACT

A disc pelletizer wherein the inner sides and an adjacent annular portion of the bottom of the pan are covered with ultra high molecular weight polyethylene or the like. The uncovered bottom portion of the pan is cleaned by vertical rods having tungsten carbide tipped bottoms, which rods are carried by an arm which is rotatable about a circular path corresponding to a radius of the bottom of the pan, so that as the pan slowly rotates, sucessive circular paths are described by the tungsten carbide tipped bottoms to effectively clean the bottom of the pan with minimum expenditure of electrical energy.

2 Claims, 3 Drawing Figures

DISC PELLETIZER

This invention relates to improvements in disc pelletizers.

BACKGROUND OF THE INVENTION

Disc pelletizers which have been manufactured in the past have been produced of steel with no lining material to keep the material, which is being processed, from sticking or adhering to the steel pan. When processing materials, which are both sticky and which set or harden, the "build-up" at the vertical side of the pan and at the bottom area adjacent the side occurs very rapidly. Many types of scrapers have been utilized to control the "build-up", but none have been successful because of the adhesion between the pan side and the process material. This adhesion or caking is greatest in the corner where the vertically extended pan side and pan bottom come together. In this corner area, the scraper wears very fast which causes the build-up to harden and wear the scraper even faster. The action of the scraper requires much force and energy and increases the horse power required to turn the pan. Moreover, known scrapers are knife-like and consume abnormal amounts of energy to clean the bottom of the pan.

SUMMARY OF THE INVENTION

The solution to this problem according to the present invention is to line the inner portion of the pan side and portion of pan bottom approximately 4 to 6 inches wide with U.H.M.W. polyethylene or the like. In addition, instead of using knife-like scrapers to clean the bottom of the pan, tungsten carbide rods or tings of cylindrical shape which rotate about a central axas are guided along a circular path, which path constitutes substantially the radius of the pan. It is very important that only a small portion of the bottom of the pan be made frictionless since the friction between the bed and pan bottom causes the material being processed to carry up the disc as it rotates and then rolls down the face to form pellets. The lining is preferably held in place with mechanical fasteners, It is important that U.H.M.W. polymer be securely fastened to the steel pan substrate. Allowing for the inherent linear expansion and contraction of the polymer requires proper spacing and quantities of the fastener selected. The inside head of the fastener should be flush with surface of the lining.

DETAILED DESCRIPTION OF THE DRAWING

Figure 1:
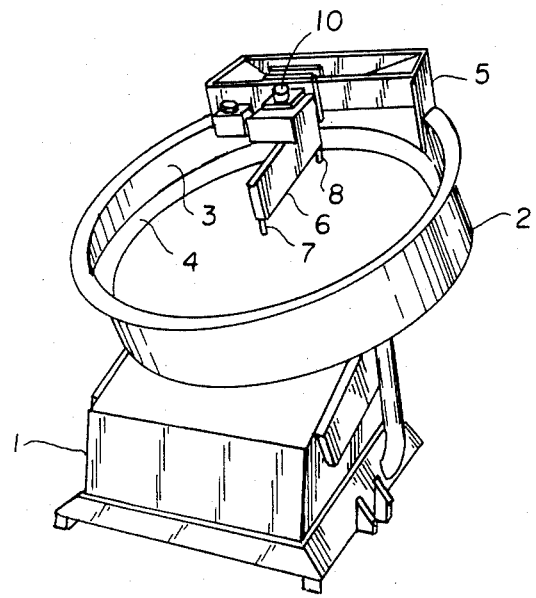
FIG. 1 is a perspective view of a disc pelletizer embodying certain features of the present invention.

Referring more particularly to FIG. 1 of the drawing, numeral 1 denotes a base on which is tiltably and rotatably mounted a pan 2 having an inner side surface 3 and an adjoining annular surface 4 laid on the bottom surface of the pan which surfaces are covered with ultra high molecular weight polythelene which is about ¼ inch to ⅜ inch thick and which has more than 4.5 million ultra molecular weight polymer. Frame 5 is supported above pan 2.

For the sprayed on non-sticking surface, use may be made of a Product named BR-3s sold by Normac, Lisle Illinois or a product known as Tyvar 88 made by Menasha Corporation of Fort Wayne, Ind., or a product named Durall 55 of RMS Corporation, Lawrence, Pa.

Figure 3:
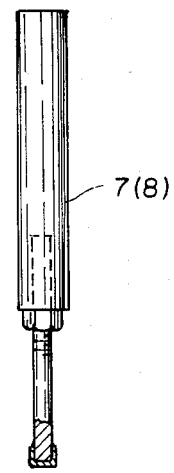
FIG. 3 is an elevational view of one of the tungsten tings having a tungsten carbide coated tip.
Figure 2:
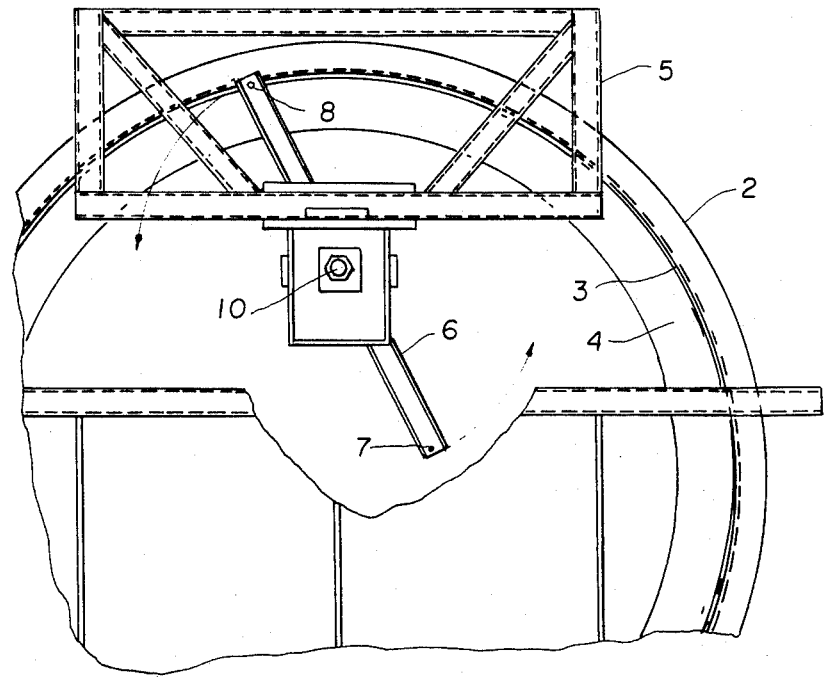
FIG. 2 is a top view of the pan more clearly showing the path of rotation of the tungsten scraper tings.

Referring to FIGS. 1 and 2, it will be noted that a rotating arm 6 carries at its ends vertically extending cylindrical tungsten carbide rods or tings 7 and 8 of a contruction more clearly shown in FIG. 3. Motor means 9 are provided for rotating arm 6 about its center 10 as a pivot so as to describe a circular path by the tungsten carbide tips of the tings 7 and 8. The bottom surface of the tings 7 and 8 are substantially flat contacting the bottom of the pan and each of the tings is driven along a circular path so that as the pan is rotated by well known mechanism in base 1, the entire area of the bottom of the pan will be substantially covered by successive substantially circular paths of travel of tings 7 and 8 effectively cleaning the bottom with minimum expenditure of electrical energy.

While ultra high molecular weight (U.H.M.W.) polyethylene is preferred, any of the materials which do not absorb water or which are non-sticking can also be utilized. The liner can be installed as a sheet or it could be sprayed on the steel.

Thus it will be seen that I have provided a highly efficient disc pelletizer from a power consumption standpoint for limiting difficult-to-remove deposits on the vertical inner surface region of the pan and by providing tungsten carbide tipped rods which are rotatable along substantially circular paths on the bottom of the pan in a radial region thereof.

While I have illustrated and described a single specific embodiment of my invention, it will be understood that this is by way of illustration only and that various changes and modifications may be contemplated in my invention within the scope of the following claims.

I claim:

1. A disc pelletizer comprising a titled pan rotated about its axis, said pan having its inner side surface and an adjacent annular bottom surface covered by an ultra high molecular weight polyethylene, and means for cleaning the remaining portion of said pan.

2. A disc pelletizer as recited in claim 1 wherein said means comprises an arm rotatable about a vertical axis on said pan and a vertically extending rod at each end of said arm, the bottom of which rods are coated with tungsten carbide, so as to follow successive substantially circular paths on the bottom of the pan so as to effectively clean it with minimum expenditure of energy.

* * * * *